United States Patent
Hen et al.

(10) Patent No.: US 6,346,145 B1
(45) Date of Patent: Feb. 12, 2002

(54) PAINTS CONTAINING LOW SHEEN OPACIFYING PIGMENTS OBTAINED BY FLUX CALCINATION OF KAOLIN CLAY

(75) Inventors: John Hen; Ray Young, both of Macon, GA (US); Andres Ginez, Dayton, NJ (US); Sharad Mathur, Macon, GA (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 09/631,008

(22) Filed: Aug. 2, 2000

Related U.S. Application Data

(62) Division of application No. 09/196,059, filed on Nov. 19, 1998, now Pat. No. 6,136,086.

(51) Int. Cl.⁷ ............................... C09C 1/42; C09C 1/28
(52) U.S. Cl. .................. 106/486; 106/468; 501/146; 501/147
(58) Field of Search ........................ 106/486, 485, 106/468; 501/146, 147

(56) References Cited

U.S. PATENT DOCUMENTS

| | | | |
|---|---|---|---|
| 2,307,239 A | 1/1943 | Rowland | 106/288 |
| 3,014,836 A | 12/1961 | Proctor, Jr. | 162/181 |
| 3,021,195 A | 2/1962 | Podschus et al. | 23/110 |
| 3,309,214 A | 3/1967 | Podschus et al. | 106/288 B |
| 3,586,523 A | 6/1971 | Fanselow et al. | 106/288 B |
| 3,853,573 A | 12/1974 | Ferrigno | 106/288 |
| 3,853,574 A | 12/1974 | Ferrigno | 106/288 B |
| 4,001,362 A | 1/1977 | Delmon et al. | 264/56 |
| 4,014,709 A * | 3/1977 | Dykstra et al. | 501/147 |
| 4,219,360 A | 8/1980 | Thompson | 106/45 |
| 4,816,074 A | 3/1989 | Raythatha et al. | 106/468 |
| 4,851,048 A | 7/1989 | Jones et al. | 106/446 |
| 5,516,364 A | 5/1996 | Brantley et al. | 106/484 |
| 5,908,499 A * | 6/1999 | Tourangeau | 106/470 |

* cited by examiner

*Primary Examiner*—Michael Marcheschi
(74) *Attorney, Agent, or Firm*—Raymond F. Keller

(57) ABSTRACT

Flux calcined kaolin clay especially useful as a pigment for low sheen paints is obtained by mixing hydrous kaolin with an aqueous solution of alkaline flux, spray drying, pulverizing, calcining and repulverizing.

3 Claims, No Drawings

PAINTS CONTAINING LOW SHEEN OPACIFYING PIGMENTS OBTAINED BY FLUX CALCINATION OF KAOLIN CLAY

This application is a divisional of application Ser. No. 09/196,059 filed Nov. 19, 1998 U.S. Pat. No. 6,136,086.

BACKGROUND OF THE INVENTION

It is normal practice to produce kaolin pigments by calcination of purified fine particle size hydrous kaolin clay. Calcination of kaolin at temperatures up to about 1100° C. cements particles together and produces products of improved whiteness and opacity. Such pigments are widely used by the paper, plastics, rubber and paint industries. A seminal patent is commonly assigned U.S. Pat. No. 3,586,523, Fanselow et al, the disclosure of which is incorporated herein by cross-reference. This patent is directed to producing low abrasion fine particle size opacifying calcined kaolin clay, such as the pigments supplied under the registered trademarks ANSILEX and ANSILEX 93. Such pigments have an average particle size of about 0.8 microns. When used in paints, the fine calcined pigments obtained by practice of the Fanselow et al patent also provide tint strength and high sheen.

For flat paints, the low angle sheen as measured by 85 degree gloss is generally less than 10. For better flat paints, the 85 degree sheen is 4 or below. To achieve low sheen the particle size of the calcined clays is increased by changing the particle size distribution of the feed such that the feed is coarser than used by Fanselow et al. While a sheen of 4 is achievable by calcining a coarser feed, the hiding and tint strength properties are compromised (reduced). It is extremely difficult to balance the properties of a paint formulation since 85 degree sheen and opacity/tint strength move in opposite direction to their particle size. Thus, as particle size in the optically efficient range increases, opacification decreases. The following commonly assigned patent, U.S. Pat. No. 4,525,818, Kostanzek, discloses means to produce certain coarse calcined kaolin clay pigments especially useful as primary extenders in paint. The calcined clay pigments have an average particle size of about 3 to 4 microns.

Practice of our invention utilizes fluxing compounds during calcination of the kaolin, the compounds being added to hydrous kaolin before calcination. Reference is made to U.S. Pat. No. 2,307,239, Rowland, which is a pioneer patent in the field of calcined kaolin pigments. This patent broadly discloses addition of various alkali and alkaline earth compounds to clay before calcination. A preferred compound is sodium chloride. U.S. Pat. No. 3,853,573, Ferrigno, discloses pigmentary compositions produced by combining a fluxing agent composed of one or a combination of metal oxides with calcined kaolin, with optional hydrous kaolin, and an inorganic binder. Dry addition of flux is practiced by Rowland and Ferrigno; no attempt is made to coarsen the clay in the optically efficient particle size range. In a thesis, "The Kaolin to Mullite Reaction Series," Wilfred Anthony Martinez, Rutgers University, 1979, various "mineralizers" were added to both a fine particle size kaolin and a relatively coarse particle size hydrous kaolin, primarily to explore the effect on the crystallinity. Dry addition of mineralizer was practiced in all experimental work. There is no attempt to control the coarsening of kaolin clay during calcination throughout the optically active size. The phrase "controlled coarsening" as used herein refers to increasing the percentage of coarsened particles throughout the particle size range of 0.5 to 2 microns.

So-called "flash" or "shock" calcination is used to produce relatively coarse kaolin derived pigments. Reference is made to U.S. Pat. No. 3,021,195, Podschus et al. Special calciners must be used and multi-stage thermal treatment is used. The rotary calciners or Nichols furnaces generally used by the kaolin industry cannot be readily reconstructed to function as shock calciners. While the calcined pigments are relatively coarse, average size about 1.4 microns, and sheen is low, the pigments tend to be more yellow than other calcined clay pigments.

SUMMARY OF THE INVENTION

Our invention overcomes this difficulty by controlled coarsening through calcination of hydrous fine size kaolin with controlled low dosages of fluxing agents. The controlled coarsening allows the calcined pigments to attain unusually low sheen while other important properties such as hiding and tint are not compromised.

The new products can be made with conventional rotary calcination kilns without new capital. This does not require use of flash calcination process to produce low-sheen pigments. The experimental products made by our invention have higher whiteness and less yellowness than commercial flash calcined low sheen pigments.

An essential feature of the process is that the fluxing agent must be water soluble and is added to the hydrous kaolin with mixing in the presence of water. Dry mixing of flux with clay before calcination, as taught in the prior art, does not result in controlled coarsening throughout the desired range of 0.5 to 2 microns. Further, dry mixing results in large amounts of oversize (grit) which may render the product of limited if any commercial use.

DETAILED DESCRIPTION OF THE INVENTION

The fluxing agent may be mixed with kaolin clay in the presence of water at various points during the processing of hydrous kaolin but is preferably added to a dispersed slurry of hydrous kaolin in solution form just prior to spray drying. The spray dried pigment is pulverized and calcined at temperatures between 500 to 1200° C. but preferably between 800 to 1070° C. See Fanselow et al, supra. The calcined product is pulverized before use in formulating paints, paper coating colors, plastics, rubber and other applications. The dosage of fluxing agent and the type of fluxing agent required are dependent on the hydrous kaolin feed and its particle size. The upper limit of temperature of calcination is dictated by the mullite index. The mullite index measures the amount of mullite ($3Al_2O_3.SiO_2$) formed from calcination.

As taught in Fanselow et al and other patents in the art, kaolin clay is conventionally dispersed before spray drying to provide fluid slurries of commercially practical solid levels. In typical practice soda ash is added normally as a part of a dispersant package during dispersion of kaolin slurries. As in the illustrative examples herein, two dispersant combinations, SAP and SAC, are generally used. SAP is an 18 to 21% solution of soda ash, partially neutralized polyacrylic acid (C211) and SHMP (sodium hexametaphosphate) at an active ratio of 49/22/29 respectively. SAC is an 18 to 20% solution of soda ash and C2111 at an active ratio of 50/50. Normally the highest level of these dispersants used is 6 #/T or 0.3% by weight (pH of slurry adjusted to 7.5). This translate to 0.15% soda ash added with SAP and 0.15% soda ash added in the case of SAC. The highest level encountered in a typical commercial plant is approximately 8 #/T SAP (pH of slurry adjusted to 8.0) which translates to 0.20% soda ash. It is believed that other kaolin manufacturers also use the same range of soda ash concentrations to disperse their slurries. In the practice of our invention, one of the preferred fluxes is soda ash. The lowest soda ash level ($\geq 0.30\%$) employed is at least 50% higher than the highest soda ash level used for dispersing kaolin slurries.

Suitable, preferred and especially preferred feeds for the practice of this invention have PSD as follows:

| | Cumulative Mass Finer (%) | | |
| --- | --- | --- | --- |
| Diameter (um) | Suitable | Preferred | Most Preferred |
| 10.0 | 100 | 100 | 100 |
| 5.0 | 100 | 100 | 100 |
| 2.0 | 87–100 | 95–100 | 96–100 |
| 1.0 | 70–100 | 80–99 | 88–99 |
| 0.5 | 37–95 | 60–93 | 70–93 |
| 0.3 | 19–95 | 35–70 | 50–70 |

At a given dosage of flux, the finer the feed, the greater is the degree of coarsening across the whole particle size rage. The degree of coarsening is defined as the change in % cumulative mass finer between the calcined product and the hydrous kaolin feed at a given diameter (equivalent spherical diameter esu). At the same dosage of flux as the hydrous kaolin feed becomes coarser, the degree of coarsening across the whole particle size range is less. A broad window for controlled coarsening is available with a fine feed, the fineness of the feed only being limited by processing capability and economics. If, however, the feed is too coarse, it becomes increasingly difficult to achieve controlled coarsening for low sheen, high hiding pigments.

The fluxing agents employed are capable of wide variation that will produce controlled coarsening of hydrous kaolin on calcination. The fluxing agents include alkali and alkaline metal ion salts of metal oxides, carbonates or their combinations. Typical metal oxides are boron oxides, silicates, alkali and alkaline earth oxides, germanates, phosphates, alumina, antimony oxide, lead oxide, zinc oxide, arsenic oxide and zirconate. Also included is boric acid. Typical carbonates are alkali and alkaline earth carbonates such as sodium carbonates, sodium bicarbonates, calcium carbonate and magnesium carbonate. This list is by no means exhaustive. Also included are organic and inorganic non-oxide salts of alkali or alkaline earth metal capable of forming metal oxides on exposure to air at calcination temperatures including halides, nitrates, acetates, hydroxides, sulfates and organic polyelectrolytes such as a sodium salt of poly[acrylic acid]. The key criteria is that the fluxing agent produces controlled coarsening of hydrous kaolin on calcination. Preferred fluxing agents are alkali and alkaline earth of boron oxides, silicates, phosphates, alkali and alkaline earth metal salts of carbonates and bicarbonates, or their combinations. Especially preferred are borax [sodium borate, $Na_2O.2\ B_2O_3$ either in hydrated or anhydrous form], soda ash [$Na_2CO_3$], sodium silicates with weight ratio of $SiO_2:Na_2O$ of 2.00 to 3.25. They are especially preferred for their ready availability, ease of mixing with hydrous kaolin in slurry form and low dosage level to affect controlled coarsening and its low cost.

The amount of flux added to the hydrous kaolin slurry may vary with the particle size distribution of the hydrous kaolin feed and the characteristics of the fluxing agent including its inherent coarsening ability and its alkali or alkaline earth metal oxide equivalent weight. It is recognized that in certain complex flux such as borax, the boron oxide component acts as a network former while the sodium oxide component acts as a network modifier to give a more random network structure. Therefore, both components of complex fluxes such as borax and sodium silicates contribute to coarsening of the particles. For ease of description, the amount of flux is given in terms of sodium oxide weight equivalent. The sodium oxide weight equivalent range is different for simple fluxes such as sodium carbonate to that for complex fluxes. The ranges are summarized as follows:

| | % flux as $Na_2O$ wt equivalent based on dry clay | |
| --- | --- | --- |
| | Simple Flux | Complex Flux |
| Range | 0.02–1.50 | 0.02–0.75 |
| Preferred | 0.20–1.00 | 0.08–0.55 |
| Most Preferred | 0.40–0.75 | 0.16–0.40 |

In the presence of flux, calcination temperatures range from above 500 to 1200 C. and preferably between about 750 to 1100 C., embracing both metakaolin and fully calcined conditions. The preferred temperature range is chosen to achieve a good balance between pigment PSD, brightness and opacity. Prior art publications disclose that the presence of certain flux reduces the calcination temperature to arrive at a given mullite content in calcined clay. We found that mullite content for fluxed calcined kaolin is not an issue in performance.

The PSD of products preferred and most preferred are:

| | % Cumulative Mass Finer Than | |
| --- | --- | --- |
| Diameter (um) | Preferred | Most Preferred |
| 10.0 | 75–95 | 80–95 |
| 5.0 | 55–85 | 75–88 |
| 2.0 | 45–70 | 50–70 |
| 1.0 | 30–50 | 35–45 |
| 0.5 | 2–15 | 5–15 |
| 0.3 | 0–5 | 0–5 |

The most preferred PSD range gives the best balance of low sheen and high hiding for the calcined product.

In the practical use of pigments of this invention for paints, it is 15 undesirable to have residue levels [retained on a 325 U.S. mesh screen] to be higher than 0.15%(wt.). The residue may appear in the paint film as grit or give an unsmooth feel. In fact, it is preferred to have products with +325 mesh residue at or below 0.10%(wt.). This is controlled by preventing excessive coarsening. The most preferred range of PSD for the product normally provide +325 mesh residue at or below 0.10%. For calcined products without flux, the amount of mullite ($3Al_2O_3 \cdot SiO_2$) is controlled by avoiding excessive calcination times and temperature. Our experience with the fluxed product is that even with mullite index normally thought to be high enough to give unacceptable abrasion with paper coating grades of calcined kaolin, in fact gave low abrasion. Therefore, for fluxed calcined kaolins, the value of mullite index is not an issue for performance in paints.

Intended use is in architectural paints in general and in flat interior trade paints in particular. Flat paints account for over 50% of the total volume of trade paint sales. These are high PVC (pigment volume concentration) ranging from 55 to 80% formulated above CPVC (critical PVC). Flat paints as the name suggest have very low gloss. A sheen (measured on 85 degree glossmeter) of 5 or less is highly desirable. The top of the line paints customarily have a high TiO2 loading and lower PVC. They therefore exhibit better hiding and film integrity. Flat paints also use maximum amount of extenders and calcined kaolin clay is invariably one of the extenders. The role of the calcined clay is to extend TiO2, improve opacity and tint strength and provide sheen control. Products of this invention give very low 85 degree sheen, excellent opacity and tint strength particularly in top of the line flat paints. A typical premium flat paint formulation is: For a 55 PVC flat paint using a vinyl acrylate latex resin as binder, the pigment composition is:

|  | Lb./100 gal |
|---|---|
| TiO$_2$ | 50–100 |
| Calcined kaolin | 180–210 |

Other potential application area are in exterior flat & interior egg-shell (or satin) paint.

In all examples, pre-dispersed slurries of hydrous kaolin containing dispersant mixtures were used prior to flux addition. In all cases, fluxes were added as solutions prior to incorporation into pre-dispersed slurries.

The following test procedures were used in the illustrative examples:
 GEB—TAPPI Method T646 om-86 (brightness of clay and other mineral pigments)
 PSD (Particle Size Distribution)—Measured with Sedigraph using Micromeritics SEDIGRAPH 5100; reported on a weight bases.
 Contrast Ratios—measures hiding power of paints by reflectometry—ASTM D2805-88
 Reflectance—ASTM D2805-88
 Whiteness—ASTM E313-73
 Yellowness—ASTM E313-73
 Sheen—measures near-grazing shininess or specular gloss at 85° geometry—ASTM D523-80
 Tint Strength Y—standard method for relative tint strength of white pigments by reflectance measurements—ASTM D2745-80
 Gardner Coleman Oil Absorption Test is based on ASTM D-1483-84
 Mullite Index is determined by an Engelhard Standard Lab Test Method MGA 0990.1. The automated powder X-Ray diffractometer is used to determine the integrated peak intensities of 2 Mullite reflections (121 and 331) for the calcined kaolin sample, a 100% reference Mullite and one working standard. The method generates a number designated as the Mullite Index, which is the ratio of the average integrated intensity of the reflections for a sample, to the corresponding reflections for the set of working standards.

EXAMPLE 1

Several hydrous kaolin feeds of different average particle size and without added flux were calcined at 1066° C. The particle size of the feed and calcined product are given in Table 1. Data in Table 1 show that on calcination, the average particle size increased with feed particle size. The pigments were formulated into 55 PVC latex flat paints using a vinyl acrylic latex resin as binder. The pigment formula used in units of lb/100 gal consisted of 100 lb. of TiO2 and 180 lb. of calcined kaolin clay. Total solids were 35.64% by weight and 22.81 by volume.

When formulated in 55 PVC latex flat paints, A and B pigments have high hiding (high contrast ratio) and tint strength but very high sheen. Note that A and B are representative of pigments obtained by practicing the teachings of Fanselow et al. These attributes disqualify A and B pigments from being used in flat paints. The coarser C pigment at 1.4 micron average particle size gave 5.9 sheen and sufficient hiding and tint to qualify it for use in flat paints. For premium flat paints, however, sheen values of 4.0 or below is desired.

TABLE 1

Typical Paint of Conventional Calcined Kaolin Clays in 55 PVC Latex Flat Paint

| Pigment | A | B | C |
|---|---|---|---|
| Ave Particle Size of feed in um | 0.3 | 0.4 | 0.7 |
| Ave Particle Size of product in um | 0.8 | 0.9 | 1.4 |
| As 55 PVC latex Flat Paint* Properties | | | |
| Contrast Ratio 1.5 mils | 95.9 | 96.02 | 91.5 |
| Contrast Ratio 3.0 mils | 98.8 | 98.5 | 96.4 |
| Reflectance | 94.8 | 95.0 | 92.2 |
| Whiteness | 81.3 | 84.0 | 76.6 |
| Yellowness | 3.57 | 2.88 | 4.24 |
| Sheen 85 degree | 22.7 | 13.4 | 5.9 |
| Tint Strength Y | 56.3 | 55.4 | 47.2 |

*Pigment Formula in lb/100 gal:100 TiO2, 180 calcined kaolin clay

EXAMPLE 2

In accordance with the present invention, a filter cake of hydrous kaolin with an average particle size of 0.2 micron was dispersed and sufficient aqueous solution of 2.0% sodium tetraborate decahydrate (borax) added to provide a 1.0% dosage on kaolin solids. The slurry was mixed thoroughly for an additional 15 minutes. The pH of the slurry was 8.8. The slurry was spray dried and pulverized in a Mikro Mill (from Pulverization Machinery Co., of Summit, N.J.). The pulverized material was calcined in a Thermolyne muffler furnace at 815° C. The product was pulverized in conventional manner. The sample was identified as D. A separate sample, identified as E, was calcined at 1066° C. and pulverized. The pigments were formulated into 55 PVC latex flat paints using a vinyl acrylic latex resin as binder. The pigment formula used in units of lb/100 gal consisted of 50 lb. of TiO2 and 210 lb. of calcined kaolin clay. Total solids were 36.86% by weight and 22.78 by volume.

The properties of pigments D and E are compared with C together with flat paint performance properties in Table 2. Also compared is a commercial double calcined pigment supplied under the registered trademark OPTIWHITE (flash calcination followed by conventional calcination) from Burgess Pigment.

The borax containing pigments D and E are finer in average particle size than C, but produced dramatically lower sheen, higher hiding and tint strength than C. Pigments D and E are considered excellent pigments for premium flat paints. The commercial shock calcined kaolin showed slightly higher sheen, lower hiding and tint strength than either D and E. Pigment E gave higher whiteness and less yellowness than OPTIWHITE pigment.

TABLE 2

Comparative Properties and Flat Paint Performance of Borax Flux Calcined Kaolin

| Pigment | C | D | E | OPTI-WHITE |
|---|---|---|---|---|
| % borax | 0 | 1.0 | 1.0 | 0 |
| Calcination Temperature | 1066 C | 815 C | 1066 C | |
| GEB | 90–92 | 91.0 | 92.9 | 91 |
| Ave Particle Size of Feed in um | 0.7 | 0.2 | 0.2 | |
| Ave Particle Size of Product in um | 1.4 | .7 | 1.0 | 1.4 |
| % at 10 um | 98.1 | 88.6 | 85.0 | 95.9 |
| % at 5 um | 89.0 | 73.6 | 70.0 | 87.7 |
| % at 2 um | 61.7 | 61.6 | 57.6 | 62.1 |
| % at 1 um | 38.2 | 56.0 | 48.8 | 34.8 |
| % at 0.5 um | 10.5 | 20.0 | 13.8 | 5.6 |
| As 55 PVC latex Flat Paint* Properties | | | | |
| Contrast Ratio 1.5 mils | 89.5 | 92.7 | 91.2 | 90.1 |
| Contrast Ratio 3.0 mils | 96.3 | 97.4 | 97.1 | 96.1 |
| Reflectance | 91.8 | 95.2 | 95.0 | 94.3 |
| Whiteness | 79.0 | 73.4 | 76.3 | 72.7 |
| Yellowness | 3.48 | 4.71 | 3.92 | 4.73 |
| Sheen 85 degree | 5.1 | 2.5 | 2.8 | 3.1 |
| Tint Strength Y | 47.9 | 56.9 | 55.8 | 53.1 |

*Pigment in lb/100 gal:50 TiO2, 210 calcined kaolin clay

EXAMPLE 3

A hydrous feed slurry used for making ANSILEX 93 hydrous kaolin was mixed thoroughly with 0.75% of sodium carbonate (soda ash). The slurry was spray dried and pulverized in a Mikro Mill. The pulverized material was calcined in a Thernolyne muffler furnace at 1066° C. The product was pulverized and the sample identified as F. A separate sample identified as G was prepared in the exact manner as F except that the feed slurry was mixed with 1.0% soda ash before spray drying. The physical properties and flat paint performance of pigments F and G are compared with OPTIWHITE pigment in Table 3.

The soda ash modified pigments F and G showed at least equivalent properties compared to that of OPTIWHITE. An advantage seen is significantly lower 85 degree sheen than OPTIWHITE to give greater flatness in paint.

TABLE 3

Properties and Flat Paint Performance of Soda-Ash Flux Calcined Kaolin

| Pigment | F | G | OPTIWHITE |
|---|---|---|---|
| % soda ash (Na2CO3) | 0.75 | 1.0 | 0 |
| Calcination Temperature in C | 1066 | 1066 | |
| GEE | 91.7 | 91.4 | 91 |
| Ave Particle Size of Feed in um | 0.25 | 0.25 | |
| Ave Particle Size of Product in um | 1.5 | 1.8 | 1.4 |
| % at 10 um | 87.0 | 83.3 | 95.9 |
| % at 5 um | 75.7 | 70.2 | 87.7 |
| % at 2 um | 57.5 | 52.6 | 62.1 |
| % at 1 um | 33.8 | 30.3 | 34.8 |
| % at 0.5 um | 6.6 | 6.1 | 5.6 |
| As 55 PVC latex Flat Paint* Properties | | | |
| Contrast Ratio 1.5 mils | 90.4 | 90.2 | 89.8 |
| Contrast Ratio 3.0 mils | 96.6 | 96.3 | 96.2 |
| Reflectance | 89.8 | 89.4 | 89.4 |
| Whiteness | 73.3 | 72.4 | 73.1 |
| Yellowness | 4.58 | 4.74 | 4.57 |
| Sheen 85 degree | 1.5 | 1.1 | 3.0 |
| Tint StrengLh Y | 51.7 | 50.47 | 51.5 |

*Pigment inlIb/100 gal:50 T102, 210 calcined kaolin clay

EXAMPLE 4

In accordance with a presently preferred embodiment of our invention, an ANSILEX 93 hydrous feed slurry was mixed thoroughly with 1.0% by weight of sodium silicate (based on clay solids) with a modulus of 2.88. The slurry was spray dried and pulverized in a Mikro Mill. The pulverized material was calcined in a Thermolyne muffler furnace at 1066° C. The product was pulverized and the sample identified as H. A separate sample identified as I was prepared in the exact manner as H except that the feed slurry was mixed with 1.25% sodium silicate before spray drying. The physical properties and flat paint performance of pigments H and I are compared with OPTIWHITE pigment in Table 4. The paint formulations were identical to that described in Example 2.

The sodium silicate modified pigments H and I showed at least equivalent properties compared to that of OPTIWHITE pigment. An advantage seen in that H gave significantly lower 85 degree sheen than OPTIWHITE pigment.

TABLE 4

Properties and Flat Paint Performance of Sodium Silicate Flux Calcined Kaolin

| Pigment | H | I | OPTIWHITE |
|---|---|---|---|
| % Sodium Silicate (2.88 modulus) | 1.0 | 1.25 | 0 |
| Calcination Temperature in C. | 1066 | 1066 | |
| GEB | 90.9 | 91.0 | 91 |
| Ave Particle Size of Feed in um | 0.25 | 0.25 | |
| Ave Particle Size of Product in um | | | 1.4 |
| % at 2 um | 54.9 | 59.2 | 62.1 |
| % at 1 um | 29.5 | 35.5 | 34.8 |
| % at 0.5 um | 5.2 | 6.5 | 5.6 |

TABLE 4-continued

Properties and Flat Paint Performance of Sodium Silicate Flux Calcined Kaolin

| Pigment | H | I | OPTIWHITE |
|---|---|---|---|
| As 55 PVC latex Flat Paint* Properties | | | |
| Contrast Ratio 1.5 mils | 91.3 | 91.2 | 90.8 |
| Contrast Ratio 3.0 mils | 96.7 | 96.5 | 96.7 |
| Reflectance | 89.1 | 89.3 | 88.9 |
| Whiteness | 72.5 | 72.4 | 73.0 |
| Yellowness | 4.67 | 4.74 | 4.47 |
| Sheen 85 degree | 2.3 | 3.1 | 3.1 |
| Tint Strength Y | 44.4 | 44.2 | 44.2 |

*Pigment in lb/100 gal: 50 TiO2, 210 calcined kaolin clay

EXAMPLE 5

This example shows that the controlled coarsening of feed useful to produce ANSILEX 93 with calcined kaolin pigment soda ash flux resulted in lower oil absorption that is similar to that produced by the flash calcined OPTIWHITE pigment. The lower oil absorption is a desired property with benefits in providing higher loading of extender and improved scrub resistance of the paint film.

Oil Absorption Data Comparison: Gardner Coleman Method

| Oil Absorption Data Comparison: Gardner Coleman Method | | | |
|---|---|---|---|
| | ANSILEX 93 | 1.0% Soda Ash flux ANSILEX 93 | OPTIWHITE |
| Oil Absorption | 105–120 | 87 | 85 |
| APS um | 0.78 | 1.32 | 1.4 |

EXAMPLE 6

The results of the following tests indicate that wet processing (using soda ash and sodium chloride) followed by spray drying of ANSILEX 93 feed produces benefits not obtained by dry blending. The desired coarser but balanced PSD products are obtained using the wet processing method. The dry blend method gave significantly higher residue (retained on a 325 mesh screen) that was about 5 to 19 times higher than the wet processing method.

For these samples calciner feed and spray dryer feed was recovered at a commercial plant. To simulate prior art, the dry soda ash was added (0.8%, 1.2% and 1.6%) and mixed with hydrous kaolin in a roller mill for 1 hour. Then it was ball milled for 15 minutes. PSD analyses were performed, before and after ball milling. NaCl (dry) was added to one sample in amount of 3% by weight of the kaolin, following which it was pulverized, using the same procedures employed with soda ash. The particle size distribution (PSD) of the dry blended kiln feed samples are given in Table 5. Within experimental error for measuring PSD using SEDI-GRAPH analysis, no change was seen in the PSD resulting from dry blends of soda ash (SA) to ANSILEX 93 feed. This was true whether the blend was simply roller milled or subsequently ball milled. For purposes of comparison the same amounts of soda ash and NaCl were added to predispersed slurries and spray dried. These were then pulverized and all were calcined at 1950° F. and post pulverized.

TABLE 5

Properties of Dry blended Kiln Feed Samples

| Sample | Ball mill | 2 um | 1 um | .5 um | .3 um | Med. um |
|---|---|---|---|---|---|---|
| A93 | NO | 95.8 | 88.0 | 71.4 | 49.0 | 0.31 |
| A93 | YES | 96.8 | 88.6 | 71.9 | 49.7 | 0.30 |
| .8% SA | NO | 96.3 | 88.5 | 72.1 | 49.6 | 0.30 |
| .8% SA | YES | 95.9 | 88.0 | 71.7 | 49.0 | 0.31 |
| 1.2% SA | NO | 96.4 | 89.1 | 71.6 | 48.9 | 0.31 |
| 1.2% SA | YES | 96.1 | 88.1 | 70.8 | 48.5 | 0.31 |
| 1.6% SA | NO | 96.4 | 88.5 | 70.9 | 48.3 | 0.31 |
| 1.6% SA | YES | 96.3 | 88.7 | 70.4 | 48.1 | 0.31 |

TABLE 6

Properties of Flux Calcined Kaolins Derived From Dry Blended and Slurried Feeds

| Test | Dry/ slurry | hr | L | A | B | YI | 2 um | 1 um | .5 um | .3 um | Med. | Res. |
|---|---|---|---|---|---|---|---|---|---|---|---|---|
| As is | Slurry | 92.4 | 97.66 | −0.65 | 2.95 | 4.44 | 81.8 | 58.3 | 11.9 | 2.8 | 0.88 | 0.015 |
| As is | Dry | 92.2 | 97.66 | −0.60 | 2.85 | 4.31 | 89.7 | 69.7 | 19.7 | 4.1 | 0.74 | 0.032 |
| .8% SA | Slurry | 91.8 | 97.51 | −0.68 | 2.90 | 4.39 | 74.5 | 47.3 | 9.4 | 2.3 | 1.05 | 0.037 |
| .8% SA | Dry | 91.7 | 97.39 | −0.54 | 2.77 | 4.19 | 87.7 | 68.4 | 19.8 | 4.1 | 0.75 | 0.170 |
| 1.2 SA | Slurry | 91.7 | 97.54 | −0.70 | 2.91 | 4.39 | 68.3 | 39.8 | 6.1 | 1.3 | 1.21 | 0.037 |
| 1.2 SA | Dry | 91.7 | 97.37 | −0.62 | 2.75 | 4.16 | 85.1 | 66.3 | 19.6 | 4.4 | 0.76 | 0.307 |
| 1.6 SA | Slurry | 91.5 | 97.44 | −0.69 | 2.96 | 4.47 | 67.2 | 38.7 | 7.0 | 2.6 | 1.24 | 0.018 |
| 1.6 SA | Dry | 91.5 | 97.33 | −0.62 | 2.71 | 4.10 | 82.4 | 64.7 | 19.1 | 3.7 | 0.77 | 0.340 |
| 3 NaCl | Slurry | 92.6 | 97.74 | −0.70 | 2.74 | 4.14 | 72.4 | 36.2 | 5.3 | 2.0 | 1.24 | 0.04 |
| 3 NaCl | Dry | 92.8 | 97.73 | −0.58 | 2.56 | 3.86 | 80.5 | 44.9 | 7.3 | 2.1 | 1.08 | 0.256 |

Br = GEB, pigment brightness TAPPI T646-om-86
L = Hunter L*
A = Hunter A*

TABLE 6-continued

Properties of Flux Calcined Kaolins Derived From Dry Blended and Slurried Feeds

| Test | Dry/ slurry | hr | L | A | B | YI | 2 um | 1 um | .5 um | .3 um | Med. | Res. |
|------|-------------|----|---|---|---|----|------|------|-------|-------|------|------|

B = Hunter B*
YI = pigment yellowness index*
Res = +325 mesh residue in %
*ASTM - D2244-79, also, Color Science, G. Wyszecki/W.S. Stiles, Wiley 1967

The properties of flux calcined kaolins derived from dry blended and slurried feeds are summarized in Table 6. In all cases, the wet processing or slurry route for incorporating the flux to the pigment gave more extensive coarsening but significantly less residue. This indicates that desired coarsening is achieved more advantageously by the wet processing or pre-slurrying the flux with the hydrous kaolin pigment than by dry blending.

We claim:

1. A low sheen paint composition comprising flux calcined kaolin clay that is 75 to 95% by weight finer than 10 microns, 55–85% by weight finer than 5 microns, 45–70% by weight finer than 2 microns, 30–50% by weight finer than 1 micron and 2–15% by weight finer than 0.5 micron, and has an average particle size in the range 1.0 to 2.5 microns.

2. The low sheen paint composition of claim 1 wherein the flux is sodium carbonate.

3. The low sheen paint composition of claim 1 wherein the flux is sodium silicate.

* * * * *